United States Patent
Alexander et al.

(10) Patent No.: US 9,998,414 B2
(45) Date of Patent: Jun. 12, 2018

(54) PEER-ASSISTED MAIL THREAD MANAGEMENT

(71) Applicant: International Business Machines Corporation, Armonk, NY (US)

(72) Inventors: Stefan Alexander, Schkeuditz (DE); Alexander Neef, Stuttgart (DE); Matthias Seul, Kassel (DE)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 14/933,323

(22) Filed: Nov. 5, 2015

(65) Prior Publication Data

US 2017/0134323 A1    May 11, 2017

(51) Int. Cl.
*G06F 15/16* (2006.01)
*H04L 12/58* (2006.01)

(52) U.S. Cl.
CPC .............. *H04L 51/16* (2013.01); *H04L 51/30* (2013.01)

(58) Field of Classification Search
CPC ................................. H04L 51/16; H04L 51/30
USPC ......................................................... 709/206
See application file for complete search history.

(56) References Cited

U.S. PATENT DOCUMENTS

| | | | |
|---|---|---|---|
| 7,269,622 B2 | 9/2007 | Brown et al. | |
| 7,516,186 B1 * | 4/2009 | Borghetti | G06Q 10/107 707/999.104 |
| 7,716,593 B2 | 5/2010 | Durazo et al. | |
| 7,720,921 B2 | 5/2010 | Heidloff et al. | |
| 8,024,412 B2 | 9/2011 | McCann et al. | |
| 8,392,519 B2 | 3/2013 | Madnani | |
| 8,402,096 B2 | 3/2013 | Affronti et al. | |
| 8,560,615 B2 | 10/2013 | Buchheit et al. | |
| 8,700,717 B2 | 4/2014 | Buchheit et al. | |
| 8,849,918 B2 | 9/2014 | Drouet et al. | |
| 2009/0063636 A1 * | 3/2009 | Heidloff | H04L 51/00 709/206 |
| 2012/0167174 A1 * | 6/2012 | Saxena | G06F 21/645 726/3 |
| 2014/0330913 A1 | 11/2014 | Pascal | |

OTHER PUBLICATIONS

Disclosed Anonymously, "Multi Thread Mail Management", ip.com 000224879, Jan. 9, 2013, 7 pages.
"Managing Threads", http://developers.google.com/gmail/api/guides/threads, dated Aug. 11, 2015, pp. 1-2.

* cited by examiner

*Primary Examiner* — Wing F Chan
*Assistant Examiner* — Joseph Maniwang
(74) *Attorney, Agent, or Firm* — Reza Sarbakhsh

(57) ABSTRACT

According to one embodiment, a method for message-thread management with a messaging client is provided. The method may include receiving a message-thread containing a signature and a body, with the signature including a composite identifier which may include a thread identifier, a tangent identifier, a sender identifier, a depth-level identifier, and a unique message identifier, determining that message-thread content is missing from the message-thread, sending a broadcast message using a peer-to-peer protocol requesting the missing message-thread content, and receiving the missing message-thread content via the peer-to-peer protocol. The message client may include a peer-to-peer communication protocol manager for handling the peer-to-peer protocol.

18 Claims, 9 Drawing Sheets

PEER-ASSISTED MAIL THREAD MANAGEMENT

BACKGROUND

The invention relates generally to a method for messaging management, and more specifically to a method for message-thread management with a messaging client. The invention relates further to a computer system and a computer program product for message-thread management.

Electronic communication, and in particular message-based communication, is indispensable in today's business and, in many cases, private environment. Although IP (Internet Protocol) based telephony or SMS (short message service), instant messaging services and related messaging services play a significant role, classical email has revolutionized written communication. It has also become a cornerstone in every day's life. Email systems may be operated using a central email exchange server and email clients in different forms, functions and from different software vendors. In one sense, email systems may rely on a store-and-forward concept. This may require a large central control hub administering all content and consolidate all administrative activities to manage email reception, intermediate storage and sending emails to respective target client systems. Confidentiality of the electronic communication based on emails may be affected because everything is rooted through a central email service hub.

SUMMARY

According to one embodiment, a method for message-thread management with a messaging client is provided. The method may include receiving a message-thread containing a signature and a body, with the signature including a composite identifier which may include a thread identifier, a tangent identifier, a sender identifier, a depth-level identifier, and a unique message identifier, determining that message-thread content is missing from the message-thread, sending, in response to the determining that message-thread content is missing, a broadcast message using a peer-to-peer protocol requesting the missing message-thread content, and receiving, in response to the broadcast message, the missing message-thread content via the peer-to-peer protocol. The message client may include a peer-to-peer communication protocol manager for handling the peer-to-peer protocol According to another embodiment, a computer program product for message-thread management with a messaging client is provided. The computer program product may include at least one computer readable non-transitory storage medium having computer readable program instructions for execution by a processor. The computer readable program instructions may include instructions for receiving a message-thread, determining that message-thread content is missing from the message-thread, sending a broadcast message using a peer-to-peer protocol requesting the missing message-thread content, and receiving the missing message-thread content via the peer-to-peer protocol. The message client may include a peer-to-peer communication protocol manager for handling the peer-to-peer protocol.

According to another embodiment, a computer system for message-thread management with a messaging client is provided. The system may include at least one processing unit, at least one computer readable memory, at least one computer readable tangible, non-transitory storage medium, and program instructions stored on the at least one computer readable tangible, non-transitory storage medium for execution by the at least one processing unit via the at least one computer readable memory. The program instructions may include instructions for receiving a message-thread, determining that message-thread content is missing from the message-thread, sending a broadcast message using a peer-to-peer protocol requesting the missing message-thread content, and receiving the missing message-thread content via the peer-to-peer protocol. The message client may include a peer-to-peer communication protocol manager for handling the peer-to-peer protocol.

BRIEF DESCRIPTION OF THE SEVERAL VIEWS OF THE DRAWINGS

It should be noted that embodiments of the invention are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

Figure 1A:
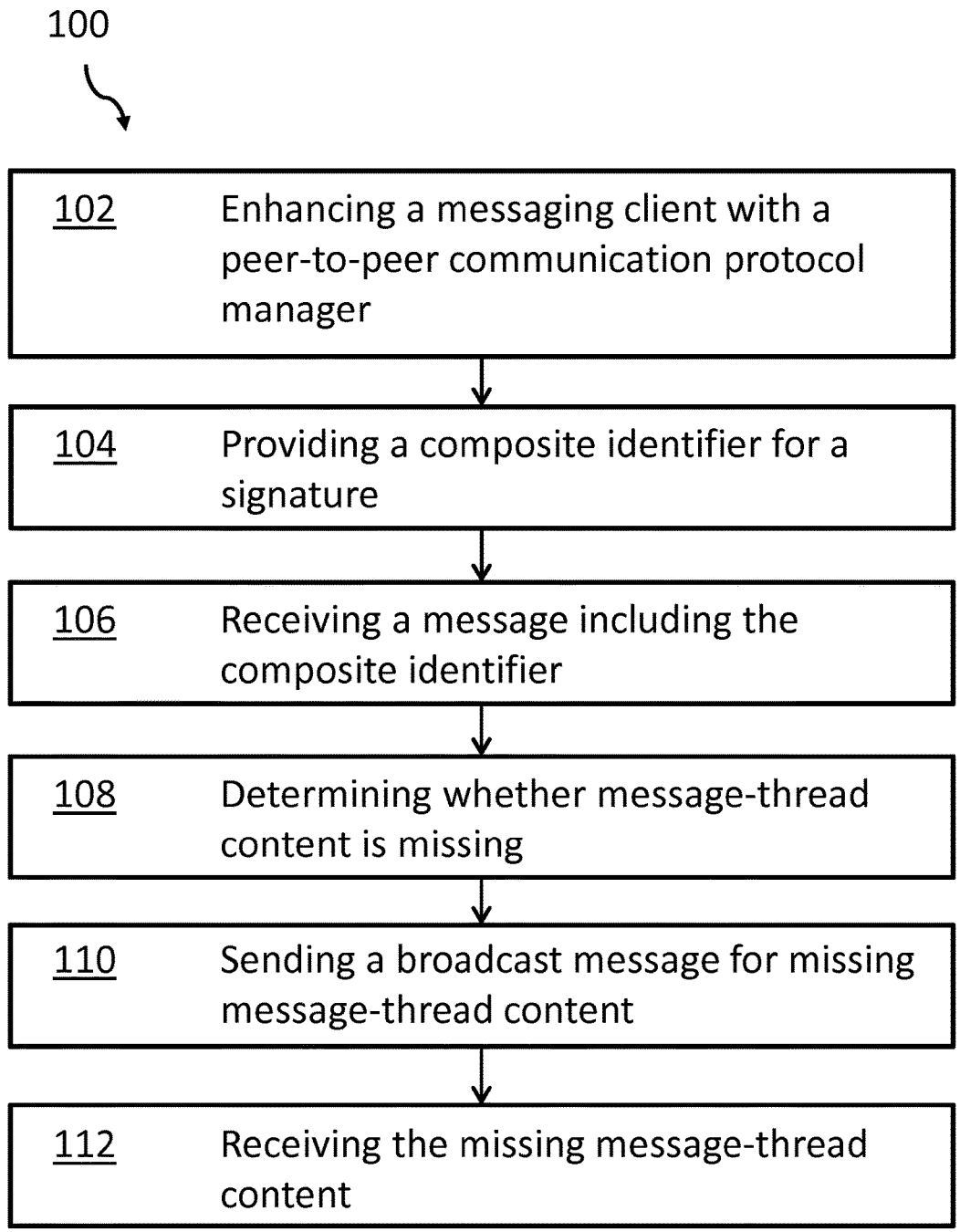
Figure 1B:
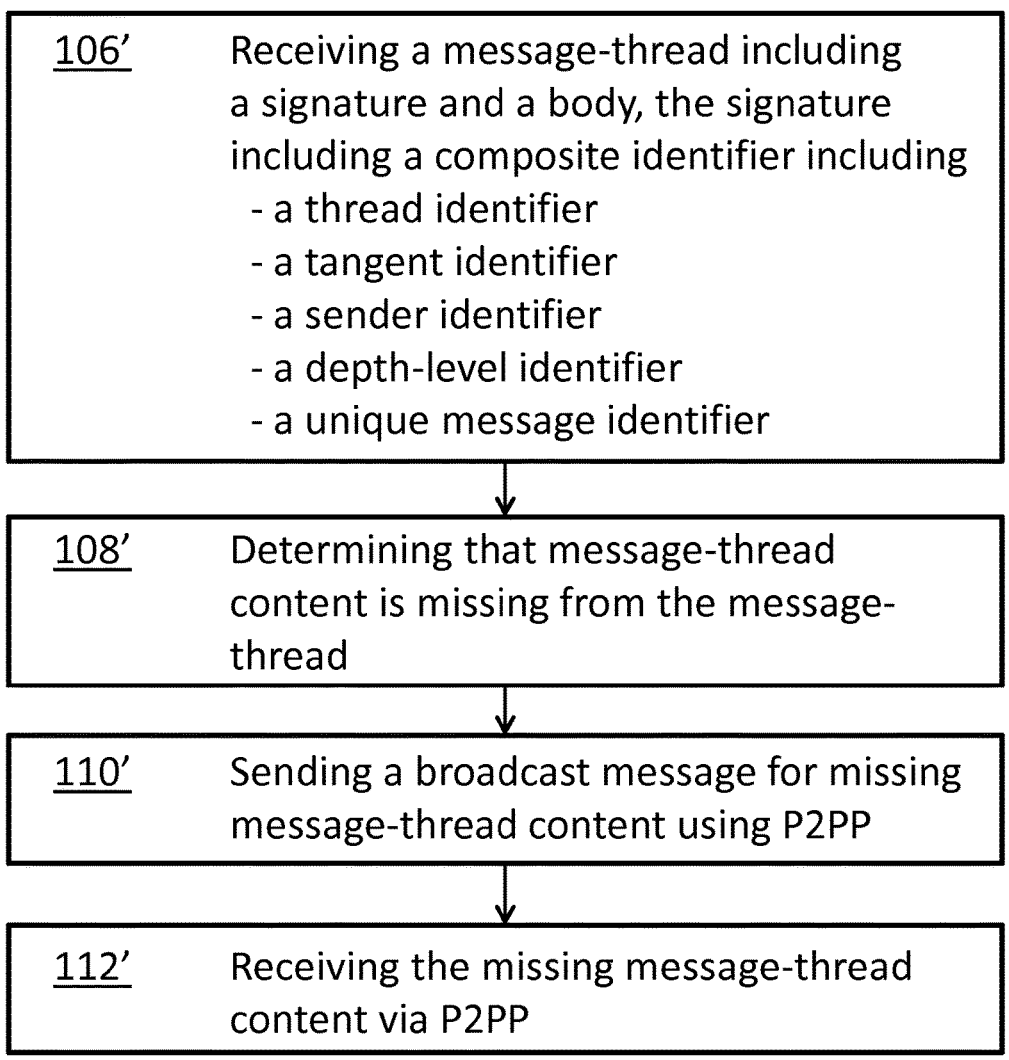
Figure 2:
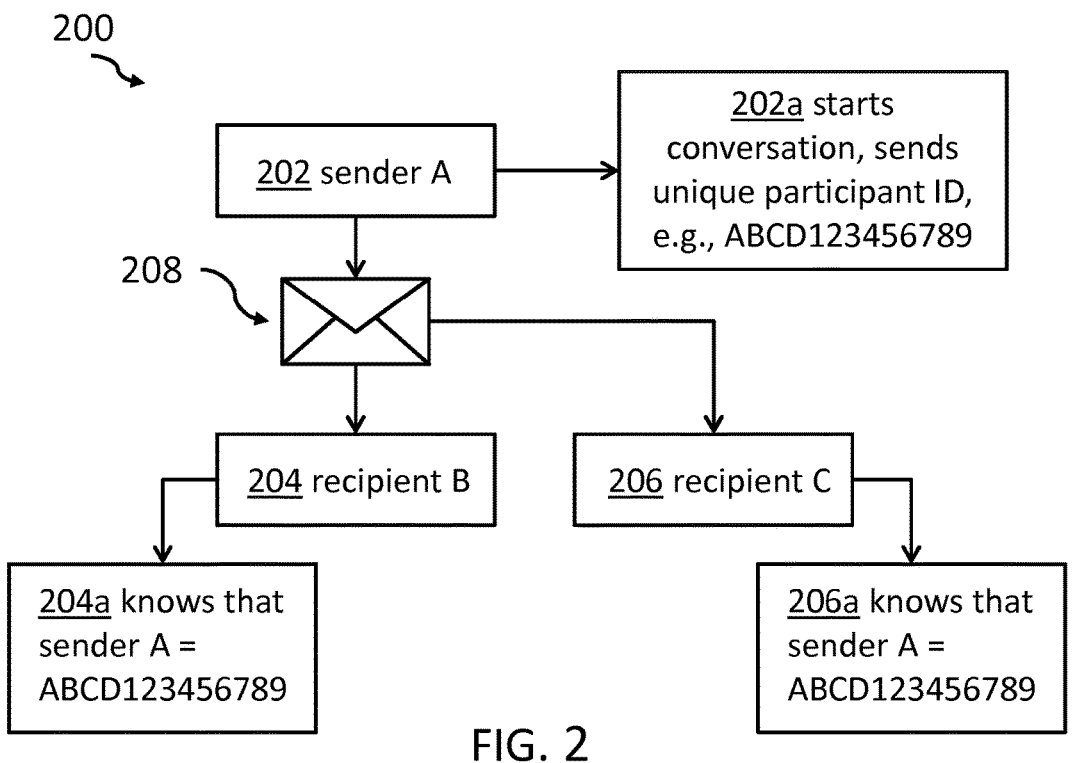
Figure 3:
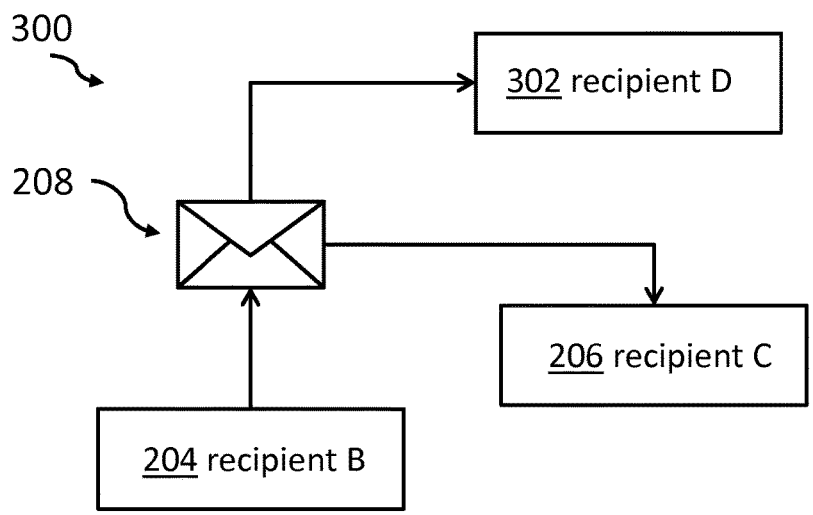
Figure 4:
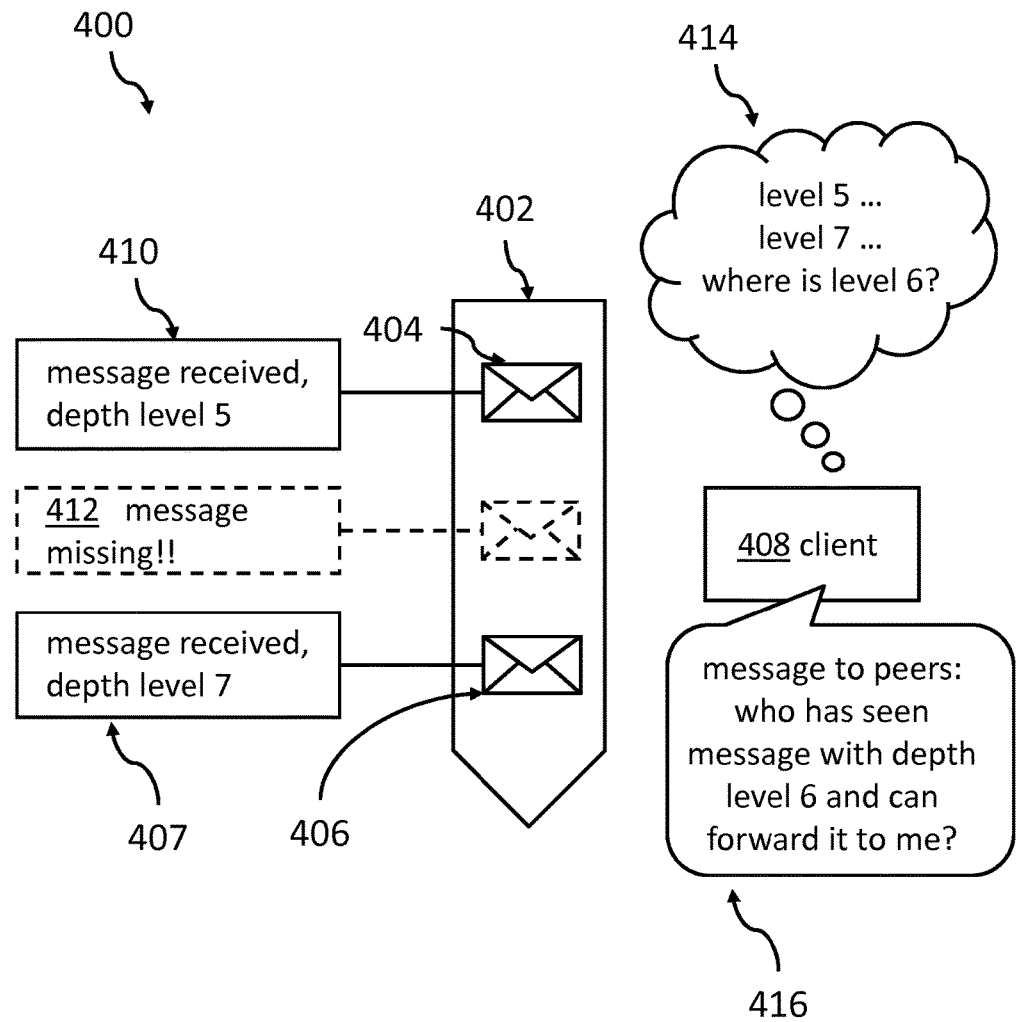
Figure 5:
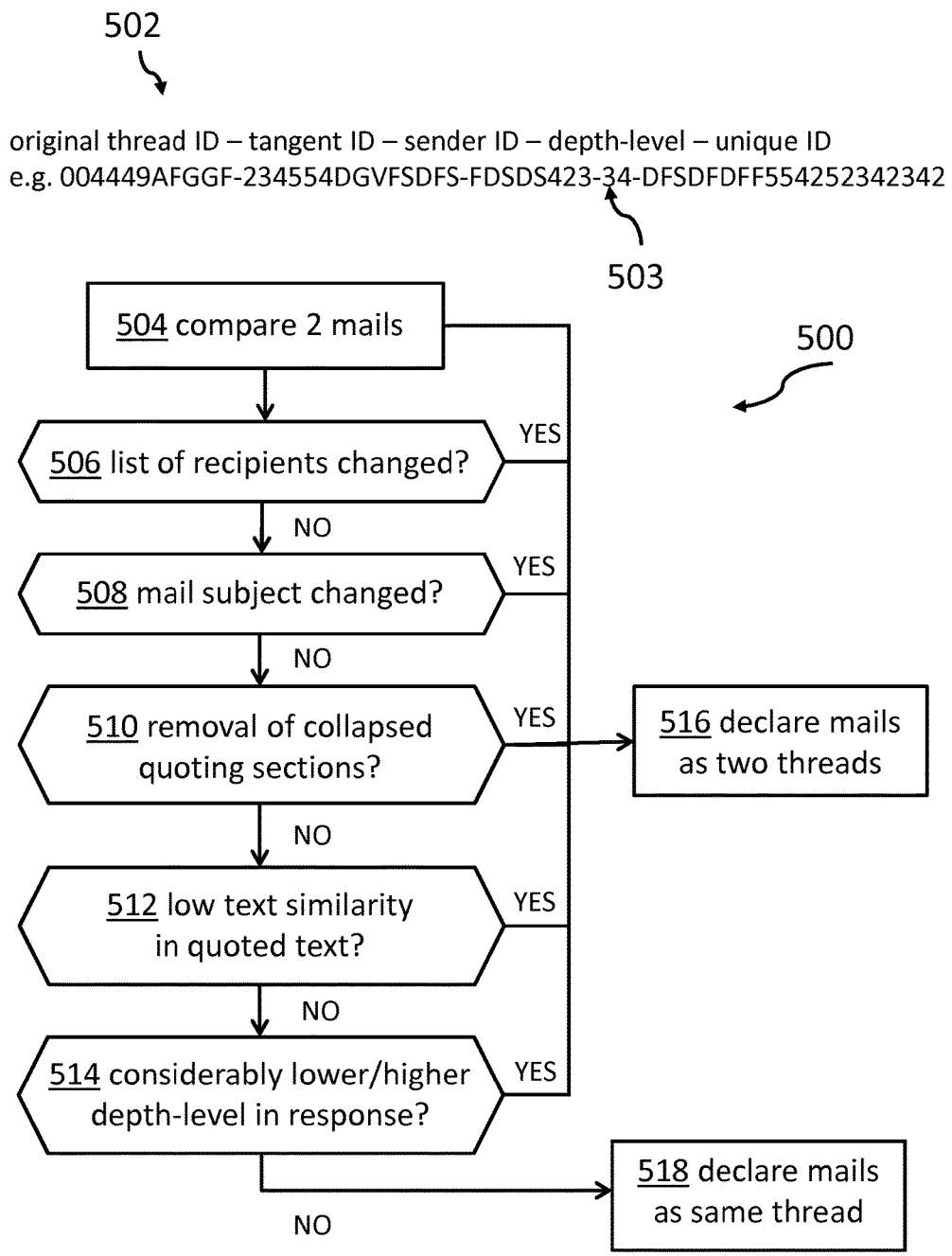
Figure 6:
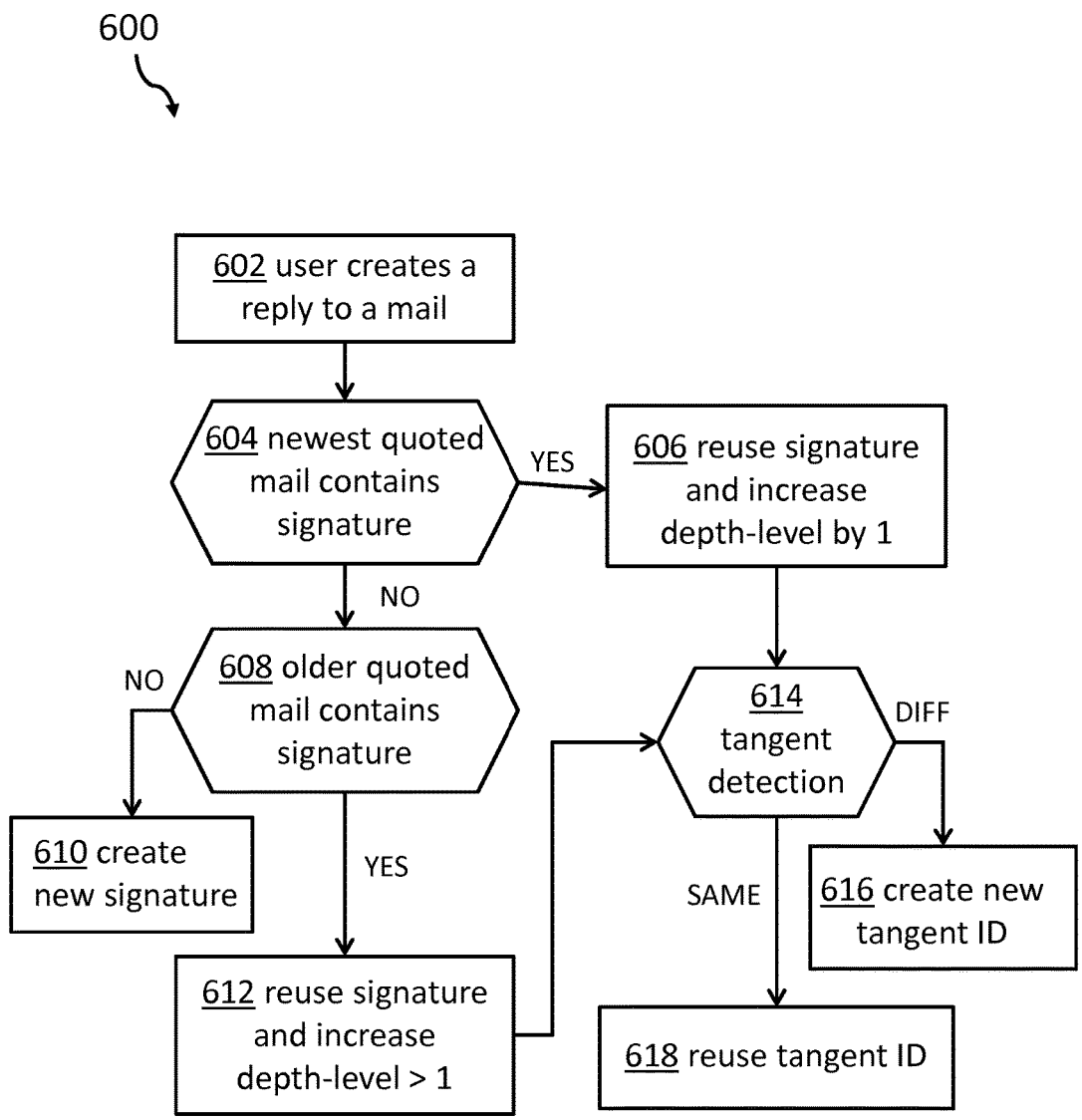
Figure 7:
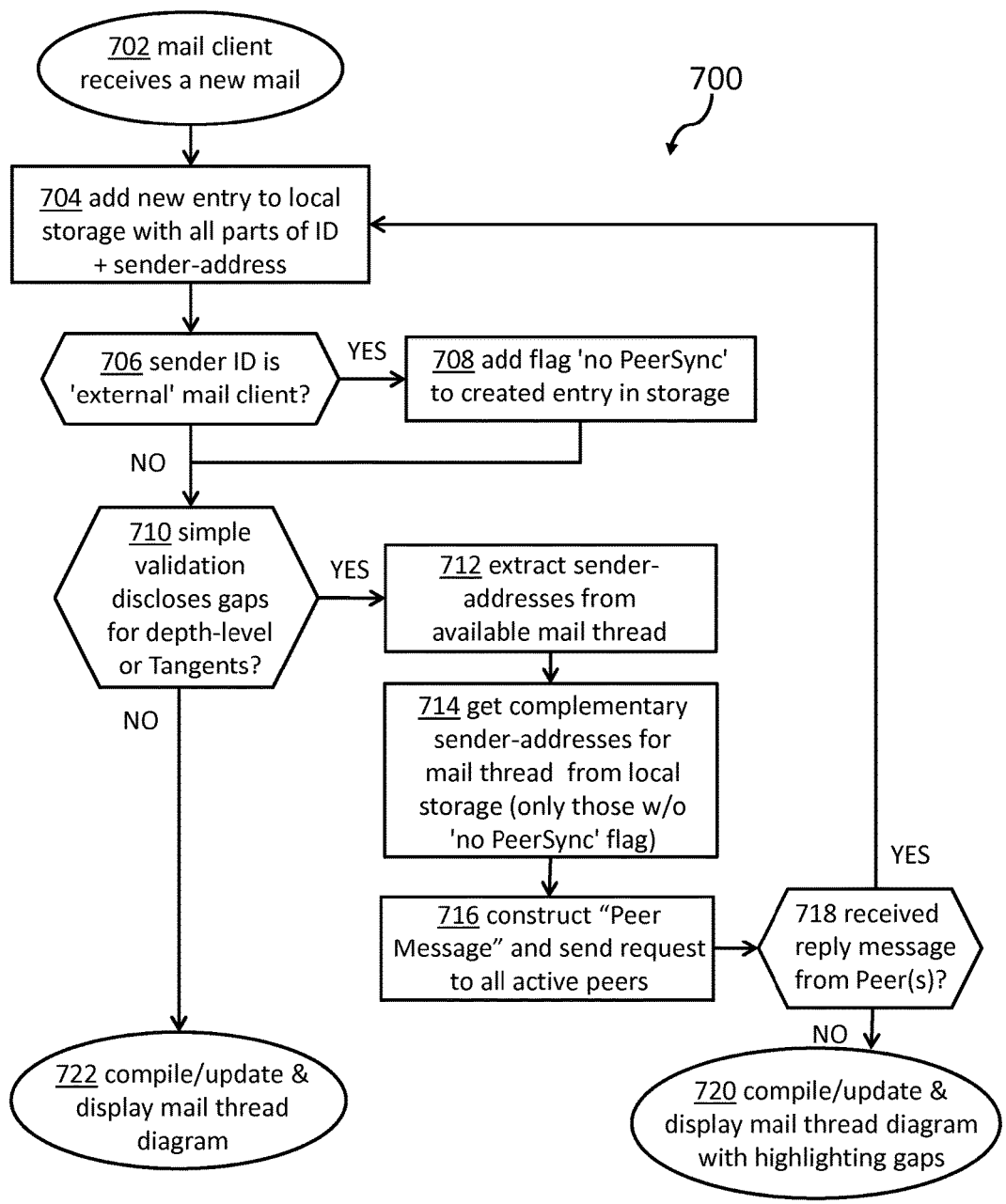
Figure 8:
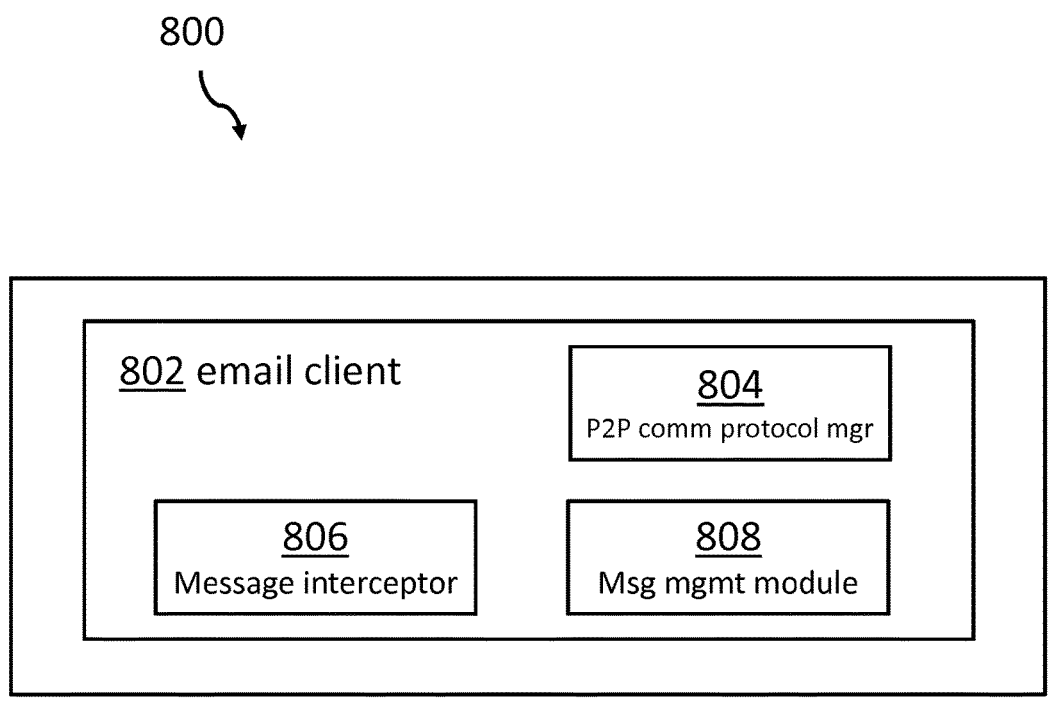
Figure 9:
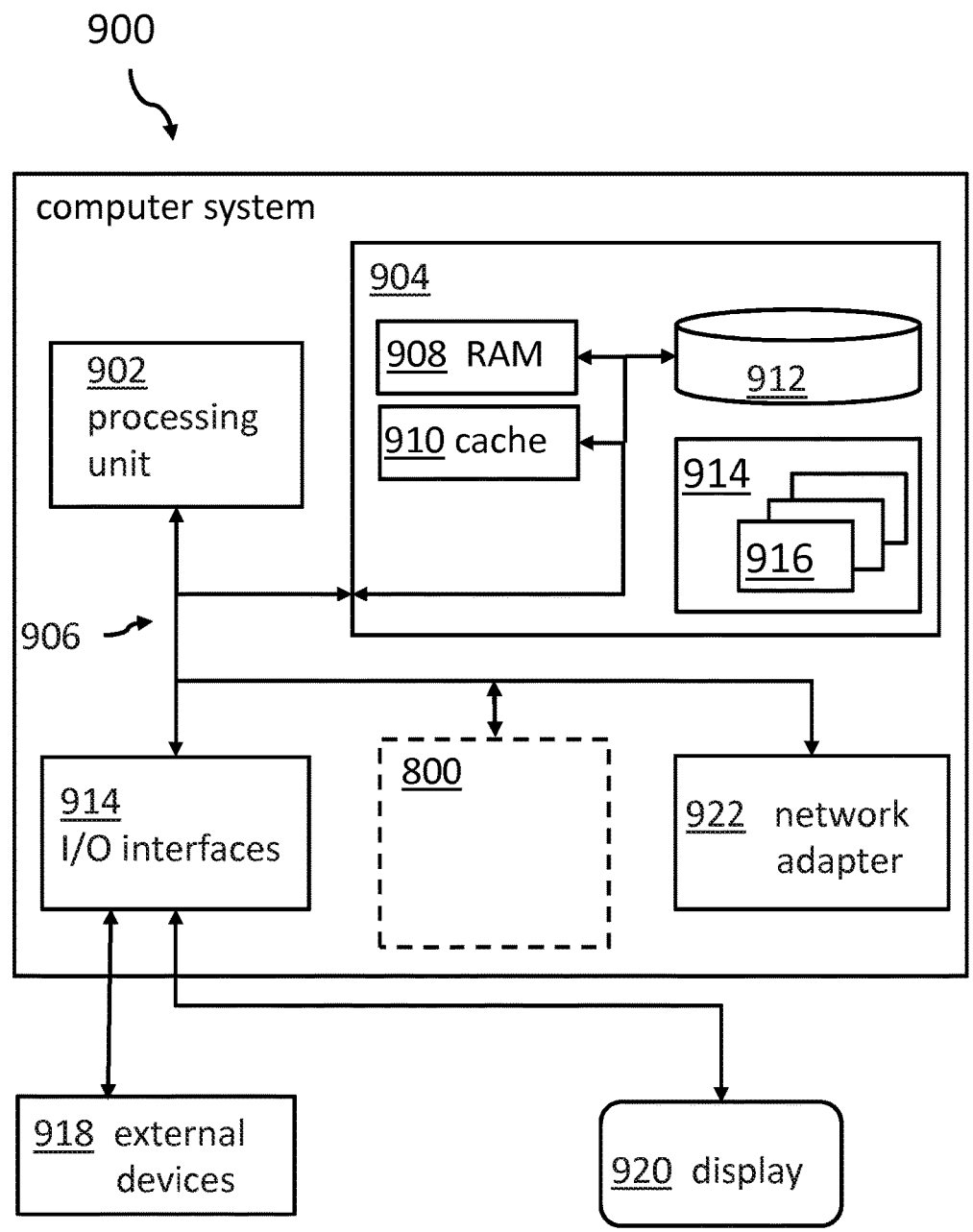

Preferred embodiments of the invention will be described, by way of example only, and with reference to the following drawings:

FIG. 1A is a flowchart illustrating a method for message-thread management with a messaging client, according to an embodiment;

FIG. 1B is a flowchart illustrating another method for message-thread management with a messaging client, according to an embodiment;

FIG. 2 is a block diagram illustrating a start of a conversation, according to an embodiment;

FIG. 3 is a block diagram illustrating a peer discovery process, according to an embodiment;

FIG. 4 is a block diagram illustrating content discovery, according to an embodiment;

FIG. 5 is a block diagram/flowchart illustrating a handling determination for message-threads, according to an embodiment;

FIG. 6 is a block diagram/flowchart illustrating a creation of a response to a received message, according to an embodiment;

FIG. 7 is a block diagram/flowchart illustrating a peer connection with an email thread correlation, according to an embodiment;

FIG. 8 is a block diagram of a messaging client, according to an embodiment; and FIG. 9 is a block diagram illustrating a computing node, according to an embodiment.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

The proposed method (and computer system and computer program product) for message-thread management with a messaging client (e.g., for tracking, consolidating, and displaying a message-thread) may not require maintenance and administration of a central communication servers and related software because the proposed method (and computer system and computer program product) may utilize direct peer-to-peer message exchange. Large scale deployment of the proposed method may be handled by a relatively small group of client systems equipped to handle the proposed method (e.g., without reliance on a central server). In cases where traditional mail clients are used, the proposed method may be implemented on top of existing mail system(s), e.g., an existing mail client. An email client may be enhanced by the proposed method (and computer system and computer program product). The messaging client may be enabled to handle emails using an email server and the proposed method depending on availability of a composite identifier associated with an email.

In the case of large organization, such organizations may experience volume problems if an email client is upgraded or changed to a newer version for the entire organization. With a peer-to-peer concept, small groups of users working together intensively and exchanging messages extensively may be equipped with a new email client with additional peer-to-peer functionality. In accordance with the methods (and computer systems and computer program products) disclosed herein, a large, worldwide coordinated email client rollout may no longer be necessary. Small groups of users intensively communicating electronically with each other may implement new email clients step-by-step and thus, the burden of a worldwide coordinated rollout of new email clients may be diminished.

Additionally, the proposed peer-to-peer concept may provide enhanced confidentiality in message-based communication. This may be due to the lack of a central email server controlling and storing messages. Instead, the control and administration of the peer-to-peer communication concept may be delegated to the email clients. Access to confidential content may be limited to a limited number of email clients. This may affect the content of the related emails as well as meta-information like distribution lists and communication participants.

Additionally, no central administrative support for an email server system may be required. And, the proposed concept may also be implemented for different forms of email clients. It may be implemented in the form of a fat client or a thin client. The thin client, e.g., in the form of a browser interface, may implement the additional functionality in the form of a browser plug-in. Moreover, it may not be required to implement completely new email message systems because the proposed concept may be treated as an add-on or additional functionality to existing email clients. Thus, the novel email client may communicate using the classical email relying on a central server or, alternatively, the novel email client may communicate in a peer-to-peer format not requiring any central server assistance. Thus, a mixed mode may be easy to implement.

The proposed composite identifier may also be instrumental in a trouble-free management of message-threads even if parts of the message-thread may have been deleted or otherwise lost. Moreover, the composite identifier may allow to automatically decide that the original message-thread may have changed its conversation focus and thus a new message-thread may be created or split off from the original message-thread.

The functionality of the proposed method is also largely protocol agnostic. Numerous, different generally available email messaging protocols may be used and piggy-backed onto the peer-to-peer protocol.

In one embodiment the implementation may also be done as a transparent gateway placed before existing messaging servers. This gateway may intercept incoming as well as outgoing messages and/or connections to the system and augment existing interfaces, e.g. web-based mailers. For example, if an organization may use a web-based email product such—e.g., IBM® Verse™ or Google® Mail for Work—the gateway may act as a transparent HTTP(S) proxy intercepting responses by the product, processing available messages for the peer-to-peer functionality and injecting its own interface elements and information into the product's response.

FIG. 1 is a flowchart illustrating an embodiment of the method (e.g., method 100) for message-thread management, in particular email management, with a messaging client, in particular an enhanced email client, for tracking, consolidating and displaying a message-thread. The message-thread may comprise a signature and a body or at least one message body.

Message-thread management may include handling electronic messages or threads of electronic messages, e.g., emails as part of a system-to-system communication. Conversation threading is a feature used by many email clients, bulletin boards, newsgroups, and Internet forums, in which the software aids a user by visually grouping messages with their replies. These groups may be denoted as conversation, topic thread, or simply a thread. A discussion forum, email client or a news client is said to have a "conversation view", "threaded topics" or a "threaded mode" if it is possible to group messages in this manner. Threads may be displayed in a variety of different ways. Early messaging systems—and most modern email clients—may automatically include original message text in a reply, making each individual email into its own copy of the entire message-thread. Software may also arrange threads of messages within lists or different windows, such as an email inbox. These arrangements may be hierarchical, arranging messages close to their replies in a tree, or they can be linear, displaying all messages in chronological order regardless of reply relationships A messaging client may include a client software program on, e.g., a personal device like a personal computer or a mobile device for personal communication. However, also a server may have implemented a messaging client. Typically, a software program functioning as a messaging client or an email client may rely on a central email server for ensuring a consistent messaging.

A signature may include code based on a technical method or concept by which the authenticity of a given piece of content can be verified. Authenticity in this context may mean verifying both, origin as well as fidelity of the content being transmitted. The signature may be generated on a given piece of content and may include an information block and a payload block. The information block may contain the actual signature in the form of a description of location and length of the payload block covered, as well as a signature ID (identifier) that may be comprised of a hash, based on the payload content (e.g., MD5 hash) as well as additional identifying information such as a global unique identifier (GUID). The payload block may contain the actual payload in a format acceptable to the protocol used. This may be raw content, encoded (e.g., base64), binary or another type of format. The payload may commonly be identical to what will in the following be referred to as "message body" or just "body". The location of both information and payload block may be chosen freely with a preferred embodiment placing the information block before the payload block, thus forming a "header", with (string-based) delineation markers helping to differentiate the two.

A body (e.g., an email body, a message body, etc.) may include a content or content section of an email or electronic message. It may be freed of address and other helping information designed to ensure that an email or message may be delivered to its addressee. The information surrounding a body of an email may also help managing an email or message-thread. Also formatting instruction and/or security information may be included. Everything not belonging to such administrative purposes may be considered a body of a message, e.g., substantive content of the message. A messaging-thread may thus be viewed as a list of bodies belonging to one signature.

At 102, the method may include enhancing (e.g., modifying) the messaging client—more specifically, enhancing a traditional email client—with a peer-to-peer communication protocol manager for handling a peer-to-peer communication protocol, in particular over an existing network connection.

A peer-to-peer communication protocol may include a communication protocol not relying on a central hub for an intermediate receiving of a message and then forwarding it again to its final destination. Instead, the peer-to-peer communication protocol may be enabled to address its peers directly without the help of a central server system. Every enabled peer system may have address information for reaching other peer systems directly. Broadcasting messages may help identify neighboring peer systems that may identify themselves by replying to such a broadcast message.

At 104, the method may further include providing a composite identifier for the signature. The composite identifier may comprise a thread identifier, a tangent identifier, a sender identifier, a depth-level identifier and a unique message identifier.

A composite identifier may refer to a structured string of characters including a series of predefined information fields as listed below.

A thread identifier may denote a randomly generated code of bits or bytes which may be different from message-thread to message-thread in order to differentiate individual threads by its identifier.

A tangent identifier may denote a sub-component of the composite identifier directed at identifying different tangent or branched-off threads from an original thread.

A depth-level identifier may denote different layers within a series of relating message or email bodies. A first or an original message may have the depth-level identifier value of zero. A first answer may have the depth-level identifier value of "1." The next body of the next reply may be assigned to the depth-level identifier value of "2", etc.

A unique message identifier may denote (e.g., a randomly generated) identification string of bytes linked to each individual message.

At 106, the method may include receiving a message including the composite identifier.

At 108, the method may include determining whether message-thread content is missing in the received message.

At 110, in case the message-thread content may be missing in the message, the method may include sending a broadcast message using the peer-to-peer communication protocol requesting the missing message-thread content.

At 112, the method may include receiving the missing message-thread content via the peer-to-peer communication protocol. It may also be noted that the messaging client may also exist without the ability to handle classical email communication using a central server, However, in such a case, an initial directory initiation process, e.g., in the form of broadcasting for discovering peer clients, may be required.

It may be noted that the messaging client may be implemented on an end user device, like a PC or another personal device, e.g., a smartphone or a tablet computer. However, there may also be an embodiment in which also a server may function as an element in the peer-to-peer concept. In such a case, the server may perform the same tasks as a messaging client would perform.

FIG. 1B is a flowchart illustrating another embodiment of the method (e.g., method 100') for message-thread management, in particular from the perspective of a messaging client. At 106', a message-thread may be received, e.g., by the messaging client. The message-thread may include a signature and a body, and the signature may include a composite identifier. The composite identifier may include a thread identifier, a tangent identifier, a sender identifier, a depth-level identifier, and a unique message identifier.

At 108', a determination may be made that message-thread content is missing from the message-thread. The missing message-thread content may include a missing email message. For example, an email thread may include a first email message and a third email message, but may be missing a second email message. The number (or depth-level) of the email messages contained in the message-thread may be ascertained from the depth-level identifiers associated with the messages contained in the message-thread.

At 110', in response to the determining that message-thread content is missing, a broadcast message may be sent using a peer-to-peer protocol requesting the missing message-thread content.

At 112', in response to the broadcast message, the missing message-thread content may be received via the peer-to-peer protocol.

The message client may include a peer-to-peer communication protocol manager for handling the peer-to-peer protocol.

In one embodiment, the method may further include generating a reconstructed message-thread by integrating the missing message-thread content into the message-thread, and the reconstructed message-thread includes all message bodies associated with the message-thread (e.g., all message bodies belonging to the message-thread which may be identifiable by the thread identifier). This may ensure—in contrast to many traditional email solutions—that the combined information of all messaging may be incorporated into the reconstruction of the complete message-thread (e.g., including the content for all participating enhanced messaging clients).

In one embodiment, the method may further include displaying the reconstructed message-thread in a graphical representation allowing navigation to any of the message bodies associated with the message-thread (e.g., allowing a user to jump to any of the message bodies of the message-thread, and thus to any depth-level). This may enhance the way a user may interact with the user's messaging client. A full navigation within the history of the message-thread may become a standard way to analyze a timeline of a message-thread.

In one embodiment, the peer-to-peer communication protocol may use an existing communication protocol as carrier protocol. This may have the advantage that no further proprietary protocols may be required for the functionality of the inventive concept. Existing messaging protocols may be used and may be piggy-backed with the additionally required peer-to-peer communication protocol, as described here. In one embodiment, the peer-to-peer communication protocol may use simple mail transfer protocol (SMTP) as a carrier protocol, e.g., the peer-to-peer communication protocol manger may use SMTP as a carrier protocol.

SMTP was initially defined by RFC 821 (request for comment in the context of the ISOC—Internet Society) in 1982, it was updated in 2008 with the Extended SMTP additions by RFC 5321—which is the protocol in widespread use today.

In one embodiment, the messaging client may maintain a directory of peer messaging clients (or respective addresses for the peer messaging clients), and the directory may provide a mapping of an email-address of a received message and the sender identifier associated with the composite identifier. This may be used for peer messaging clients as part of a discovery process for messaging client operating according to the here proposed concept.

A directory may denote a mapping of composite identifiers and relating email addresses. Each messaging client using the proposed method may manage such a directory as part of the tasks for the messaging client.

An email-address may denote the traditional addressing schema for sending and receiving emails. A name tag may be linked to a domain tag linked by the character "@", e.g., mary.smith@example.com.

In one embodiment, the method may further include comparing a newly received message with an earlier received message, and determining whether the newly received message and the earlier received message belong to a same message-thread. For example, in one embodiment, the method may further include comparing a newly received message to an earlier received message associated with the message-thread, and determining, based on a criteria catalogue, that the newly received message and belongs to the message-thread.

If the messages belong to the same message thread, the message-thread identifier may stay the same. Otherwise, a new message-thread identifier may be chosen to make it easier to differentiate between different themes or topics within different message-threads.

In one embodiment, the criteria catalogue may include a criteria selected from the group containing a changed recipient, a changed message subject, a different quoting section, a depth-level in a response, and a low text similarity in quoted text of message bodies with a depth level greater than a predefined threshold. For example, low text similarity in a quoted text and the different depth-level in a response may be considered when comparing the received message to a corresponding response. The text similarity may be based on scoring a model using at least one threshold when determining the similarity of the "received" and the "to-be-sent" message.

In one embodiment, the method may further include comparing a newly received message to an earlier received message associated with the message-thread, determining, based on a criteria catalogue, that the newly received message does not belong to the message-thread, and assigning a new tangent identifier to a response to the newly received message. This may be performed in case it may be determined that the newly received message and the earlier received message may not belong to the same message-thread. Thus, forked messaging threads may be handled elegantly. Such a forking—and thus, a usage of a new tangent identifier—may also be applied if a response to the received message differs significantly, as defined by the criteria catalogue.

In one embodiment, the messaging client may maintain a reputation score value for received sender identifiers, and the reputation score may indicate a trustworthiness level of a specific sender (e.g., associated with the received sender identifier). The reputation score may be an integer value which may be increased during every trust building activity and may be decreased during trust destroying activities. Examples of such trust building and destroying activities may be listed in table 1 (below).

FIG. 2 is a block diagram 200 illustrating a start of a conversation using a peer-to-peer concept, according to an embodiment. Sender A 202 may start a conversation (e.g., send an email) to at least two recipients (e.g., recipient B 204, recipient C 206) using classical email communication comprising an email tracking signature and a body of the email comprising the content of the email. The initial distribution of the email may be performed using a central email server 208. In a traditional email environment, the communication may be coordinated by a central email server 208. However, sender A 202 may send, as part of its email metadata, its unique participant identifier—e.g., ABCD123456789—embedded in the composite identifier (ID); see detail 202a. After having received the email by recipient B 204 and by recipient C 206 these two recipients may now "know" (identify, recognize) that sender A's 202 unique composite ID-based identifier is ABCD123456789; see details 204a, 206a. Recipient B 204 and recipient C 206 may maintain sender A's 202 email address and sender A's 202 composite ID-based participant identifier (an "identifier pair"), e.g., in their enhanced email clients in a special mapping directory.

FIG. 3 is a block diagram 300 illustrating a peer discovery process, according to an embodiment. In a scenario (depicted in FIG. 3) including recipient B 204, recipient C 206, and central email server 208, a new recipient D 302 may enter into the message-thread via an email response from recipient B 204 (e.g., sent via central email server 208). Recipient B 204 may reuse a "TO"-list from an earlier conversation. This list may also comprise recipient D 302 now. Also recipient D 302 may "know" (identify, recognize) that sender A 202 exists (and that sender A's 202 unique identifier is ABCD123456789). It may also know that recipient B 204 and recipient C 206 exist. In case of answering the received message, recipient D 302 may also include its unique participant ID to its response. This way, more and more recipients may extend and their respective peer-to-peer communication directory. For those email clients not capable of handling the proposed peer-to-peer communication concept, the included composite IDs are transparent, i.e., they do not disturb the classical way of email communication. Thus, they may be ignored.

FIG. 4 is a block diagram 400 illustrating content discovery, according to an embodiment. Block diagram 400 depicts a message flow (e.g., message-thread 402) showing a message body 404 with the depth-level 5 (see detail 410) and another message body 406 with depth-level 7 (see detail 407). The receiving messaging client 408 determines (see detail 414) that a depth-level (and in particular, depth-level 6 indicated by the dotted line box detail 412) may be missing in the message-thread 402. The messaging client 408 may respond to this missing content by sending a request message to peer clients via the peer-to-peer communication protocol comprising a question such as, "Who has seen this message with depth-level 6 and can forward it to me?" (see detail 416). For such a broadcast activity, the composite ID is used as a unique identifier.

FIG. 5 is a block diagram/flowchart 500 illustrating a handling determination for message-threads, according to an embodiment. Block diagram/flowchart 500 depicts a determination for how one or two message-threads should be handled. Here, a series of determinations is shown whether a response to a received message may be required. For example, composite ID 502 shows a depth-level of 34 (see detail 503). The probability may not be low that the original subject may have changed and that it may be better to continue with a different tangent ID. For this purpose, at 504, two messages—the received message and the corresponding reply message—may be compared. This comparison may include the following determinations:

At determination 506: is there a change in the recipient list?

At determination 508: was the message subject changed?

At determination 510: are there removed or collapsed quoting sections?

At determination 512: is there a comparably low text similarity in the quoted text in comparison to the reply?

At determination 514: is there a considerably lower or higher depth-level in the response?

In case of a "yes" determination in any of the determinations 506 to 514 it may be determined that the corresponding reply message relates to a different thread (see result 516), and may get a new thread ID in the composite ID. In case of "no" for the last determination (514), it may be determined that the received message and the corresponding reply message continue with the same thread ID of the composite ID (see result 518).

FIG. 6 is a block diagram/flowchart 600 illustrating a creation of a response to a received message, according to an embodiment. At block 602, the user may create a reply to a received message. At determination 604, it may be determined whether the newest quoted message may contain the signature. In case of "yes", at block 606, the signature may be reused and the depth-level may be increased by 1. In case of "no," at determination 608, it may be determined whether an older quoted message may contain a signature. In case of "no" (to determination 608), at block 610, a new signature may be created in the form of a new composite ID. In case of "yes" (to determination 608), at block 612, the found composite ID may be used and the depth-level may be increased by a required new depth-level.

After a determination that the signature or composite ID may be reused (see block 606), or the alternative form of reuse of the composite ID based on an older quoted message (see block 612), at determination 614, a tangent determination may be performed. If a determination may be made for a different tangent, a new tangent ID may be created (see block 616), as part of the composite ID of the reply message. If a determination may be made that the same tangent ID should be used the existing tangent ID will be reused (see block 618).

FIG. 7 is a block diagram/flowchart 700 illustrating a peer connection with an email thread correlation, according to an embodiment. At 702, an enhanced messaging client may receive a new message from an email client not equipped with the novel peer-to-peer communication mechanism disclosed herein and thus, may not be able to handle composite IDs. Therefore, firstly, at 704, a new entry may be made to the local message storage with all available components of the received message including its ID and the sender email address. At determination 706, it may be determined whether the sender ID may be an "external" email client, meaning that the sending email client may not be capable of handling composite IDs. In case of "yes," at block 708, an additional flag 'no-PeerSync' may be added to the created entry in the storage. In case of "no," or after an entry 'no-PeerSync', at determination 710, a simple validation may disclose for depth-levels or tangents, e.g., by inquiring "is information missing"? In case of "no" response (to determination 710), at block 722, a traditional email thread diagram may be compiled, updated and/or displayed.

In case of "yes" response (to determination 710), at block 712, sender addresses—i.e., sender IDs of composite IDs—may be extracted from the available email thread and, at block 714, related sender addresses from the email thread may be retrieved from the local storage in form of the composite ID form for those sender addresses without a 'no-PeerSync' flag. At block 716, a peer message may be constructed and may be sent to active peers via the peer-to-peer communication protocol. At determination 718, it may be determined whether there are reply messages from the address peers. In case of "yes," the process returns to the step of adding a new entry to the local storage (see block 704). In case of "no," at block 720, an email thread diagram may be compiled, updated and/or displayed highlighting gaps in the email thread.

It may again be mentioned that the enhanced messaging client also may also be able to deal with traditional incoming emails as well as sending traditional emails not comprising the composite ID. This mechanism may be used to email recipients from which it may be clear that they are not enabled for a peer-to-peer communication. This may be determined based on the maintained directory of peer-to-peer clients in every enhanced messaging client.

It may also be mentioned that a reputation score management may additionally be performed in the procedures described by the FIGS. 5, 6 and 7. Details of such a reputation score are described below (see table 1).

The inventive concept may largely be based on extensions of existing email client systems. The extensions may comprise a message interceptor, a message management module and a peer-to-peer network controller.

The message interceptor may be a component that has access to the client's incoming and outgoing data stream. This may be achieved by using already existing APIs (application programming interface) or extension hooks inside the email client, e.g., Mozilla®'s Thunderbird® XPI integration, a relay proxy listening on common SMTP ports such as 25 or a transparent proxy capturing or traffic automatically on a given range of ports. The 'proxying' may be achieved with off-the-shelf components such as Squid, which may use integration options such as ICAP or eCAP to hand-off captured traffic to the message interceptor. The message interceptor will then react to the sending or receiving of a new message by the client and candidate depending on the action taken.

Sending Out Messages—

If the messaging client sends out messages to an outside peer (e.g., an SMTP relay server), the message interceptor may capture the transfer and prevent direct delivery until it has finished processing. The captured message may be scanned for signs of signing by the inventive concept. If no signing—e.g., using the composite ID—may be detected, the message interceptor may sign the message, generate a new thread ID and use it with other details, such as the client's unique participant ID, a GUID (global unique identifier) for the message currently being sent and a depth-level of 0, to generate the message signing ID, which may be embedded with assigned content.

If an existing signing may be detected, the message interceptor may extract the message signing ID and may split it up in the individual parts such as the thread ID, the tangent ID, the depths level, and so on. It may then determine if the newly created message is a continuation of the existing conversation (increasing the depth-level) or forming a separate, tangent conversation. To make this distinction, the message interceptor may hand-off the message content to the message management module (see below) and receive a "continuation/tangent" classification.

If the thread is a continuation of an existing one, the message interceptor may increase the extracted depth-level by 1 and a message signing may be created with the client's unique participant ID, the thread ID, the tangent ID (if present) and an increased depth-level, as well as a message GUID.

If the thread is a new tangent the message interceptor may reset the depth-level to 0. If the message was not part of a tangent the message interceptor may generate a new tangent ID (e.g., a GUID) and place it in a respective signature ID slot. The original thread ID may be left intact. If the thread was already part of the content, the message interceptor may copy the tangent ID into the thread ID slot to generating a new tangent ID to fill the tangent ID slot.

In either case, the generated message signature ID may be used to sign the message. Once this process is completed, the message interceptor may deliver the message to the intended outside peer.

Receiving Messages—

If the client is receiving messages from an outside peer, the message interceptor may first check if the message may be a control message of the invention's peer-to-peer communication protocol. It may detect this by checking for "MSG_CONTROL_[TYPE]" in the message subject, where TYPE may be one of the supported command types. If a control message may be detected, the message interceptor may check for valid signing of the message. If the signing passes the checking procedure, the message may be handed-off to the peer-to-peer-network controller for processing. The message may not be delivered to the user's inbox or may be hidden in the user's inbox, depending on the implementation preference. If the signing may be corrupt or invalid, the message may be treated as a non-control message. If no control message is detected, the message interceptor may hand it off to the message management module for processing. After processing, the message may be delivered to the user's inbox.

Message Management Module—

A main purpose for the message management module (MMM) may be to process incoming messages and scan them for comprised threads, inline information, signing failures and create a "dossier" of the findings that may be used by the client later on for generating displays like a tree view of the conversation. The MMM may also be responsible for responding to message fetch control commands and may have access to the client's repository of emails and or messages. The MMM may handle "continuation/tangent" detection requests by the message interceptor.

Scanning of Received Messages—

If an incoming message is handed over to the MMM, the MMM may scan the message contents for multiple types of data:

1. General Thread Structure—The MMM may scan the contained message bodies going from the outermost message and begin validating the signed content. It may repeat this for every attached message body found. It may record all found unique thread ID, tangent ID, participant ID and message ID and may store them in a database for future reference.

2. Invalid Signatures (Signs of Inline-Answering)—If a given message body may contain signing that is found to be invalid, this may be a sign of inline editing/answering or redaction of content. The MMM may record the affected message body, including the message ID and thread ID in a database for future reference. It may also flag the message ID and thread ID as "tainted" to record where an inline edit occurred.

3. Jumps in Depth-levels (Signs of missing information)—While recording the thread IDs and tangent IDs, the MMM may check that the depth-levels conform to the rules enforced by the message interceptor. Depth-levels go from high to low, starting from the outermost message body and then deeper in. The chain may need to be without any gaps, so a depth-level must be, e.g., 3-2-1 not 3-1. If a depth-level may be reset to 0, it also may need to be connected to a new tangent ID or thread ID indicating the start of a new conversation. Therefore, if a jump in thread levels is detected or the thread levels are out of sync, the message may be flagged as "tainted" in that it is missing information. The MMM may record the message, affected message body, thread ID, tension ID and holes in the depth-levels for future reference in a database.

Fetch Commands—

If the MMM receives a command to fetch specific messages (e.g., from the peer-to-peer-network controller), it may scan the messages available to the client and try to retrieve the content requested. This may be achieved either by direct integration with the client, i.e., enhanced client, native reading of locally stored files (e.g., mbox files in case of Mozilla® Thunderbird®), impersonation of the client when communicating with a mail server (e.g., in the case of IMAP with no local message copies stored) or (as an additional potentially unusual method available) a complete duplication and storing of all received messages as they are intercepted. The MMM may also use a staggered combination of approaches, e.g., going for locally stored copies first and expanding the search to the mail server if no results have been found.

The MMM may, by default, only respond to the query if it may have found a positive result. It may not send out failure notices unless explicitly requested by the client. In either case, the MMM may provide either the located message or failure notice to the peer-to-peer-network controller as a response to the incoming query.

"Continuation/Tangent" Detection—

If the MMM receives a request for "Continuation/Tangent" detection, it may scan the received message body for the multiple indicators, as mentioned above. The indicators may be considered equal or weighted, depending on configuration. All contribute to a total "score." If the score exceeds a predetermined threshold, e.g., "2" if all criteria are equal, the MMM may report a "tangent" classification back to the message interceptor.

Peer-to-Peer-Network Controller—

The peer-to-peer-network controller (P2PNC) may handle the actual protocol piggy-backing on top of the chosen protocol—e.g., the SMTP protocol—and may process all control messages. In addition, the P2PNC may also have a participant reputation module for gauging information requests by previously unknown participants.

Processing of Control Messages—

When a control message is handed-off to the P2PNC, the P2PNC may check the requesting participant's reputation using the reputation module (see below). If the check is satisfactory, it may process the request according to the P2P protocol (see below). If the check indicates an insufficient reputation, the request may be rejected silently. If the MMM provides a response to an earlier P2P query by a participant in the network, the P2PNC may create a new control message according to the protocol and may send it out through the network. This may be done using an API of the messaging client, impersonating the client when communicating with the mail server or sending the message directly using an own implementation of the SMTP protocol stack.

Participant Reputation Module—

The P2PNC may receive queries from participants that the P2PNC may not have not seen before. This may be natural as the network may grow without all nodes in the network receiving notice of new participants. The new participant could also be a malicious attacker trying to siphon information off the nodes.

To avoid leaking potentially sensitive information to an outside party, the P2PNC may keep a record of all participants it may have seen in messages captured by the message interceptor and may store it in the database. It may then apply a scoring mechanism to determine a participant's trustworthiness. A previously unknown participant may start with a score of 0, which may indicate no information on the participant at all.

The P2PNC may accumulate points for the following types of activity seen by the MMM. The P2PNC may differentiate between a general score that may apply to all conversations with the client and a per-thread-score which may apply to the active thread ID only. The P2PNC may check the general score first and may fall back to the per-thread-score if the general score is insufficient. This may allow generally reputable clients from requesting information quicker. Table 1 shows more details as an example of one possible embodiment

TABLE 1

| Type of activity | General score | Per-thread-score |
|---|---|---|
| New thread started by this participant which this client is a direct recipient of | 5 | 50 |
| New thread started by this participant which this client is on CC | 3 | 50 |
| New thread started by this participant which this client is on BCC | 2 | 50 |
| This client has sent a response to a thread which this participant has created, the participant is in the recipient list | 15 | 50 |
| This client has sent a response to a thread which this participant has created, the participant is not in the recipient list | −5 | 0 |
| The participant has responded to 1:1 thread with this client | 15 | 10 |
| This client has created a new 1:1 thread with this participant | 20 | 50 |
| This client has responded to a 1:1 thread with this client | 10 | 10 |
| This participant has received responses on a thread by other participants on the network, this client is part of the recipient | 4 | 10 |

TABLE 1-continued

| Type of activity | General score | Per-thread-score |
|---|---|---|
| Accepted Control Messages (any direction) | 0 | 0 |
| Control Messages (incoming) rejected due to insufficient reputation | −1 | 0 |

To be considered "trustworthy", a given participant may need to have a reputation score of, e.g., 50 or higher. The accumulated score may be retained indefinitely but may receive a deduction in score of (e.g., threshold score/14) per day. The maximum number of score points may be (e.g., threshold deduction*30). All points accumulated beyond the limited may not be retained. The maximum number of general points receivable per day due to actions by the participant may be, e.g., threshold/2.

This concept may prefer participants which the client may actively engage with.

Having a minimum threshold that may not be reached with a single email conversation in addition to a throttling of score prevents a given client from easily gaining the trust of the network.

Peer-to-Peer Protocol—

The Peer-To-Peer Protocol or peer-2-peer communication protocol (P2PP) may be the underlying control channel piggy-backing on an existing message protocol, such as SMTP. It may be applied to any protocol but for the sake of simplicity, here, it may be showcased for SMTP only. The P2PP may retain any of the benefits and drawbacks of the protocol used, so for SMTP it may still require a set of central servers to facilitate delivery of the control messages; however, the actual processing of and reaction to the control messages may be handled on the client side.

The P2PP may be based on sending specifically control messages through the used protocol that will conform to the protocol's specifications, but may then be picked up by the message interceptor of participating clients. It may therefore be integrated with an existing network without requiring any specific server upgrade.

General Control Message Setup—

A control message always may have a subject line of "MSG_CONTROL_[TYPE]" where type may be the control request being made. The subject line should exactly match the format, both, in contents and character case. Additionally, the control message should be signed by the participant similar to a regular message. It may not have a tangent ID and may possess a depth-level of 0. Messages that may not conform to this restriction may be discarded as invalid. If the signing may be determined to be valid by the message interceptor and the participant reputation score at or above the required score threshold, the P2PNC may then extract the type of control requested.

FIG. 8 is a block diagram of a messaging client system for message-thread management (e.g., messaging client 800), according to an embodiment. The message-thread may comprise at least a signature and a body. Messaging client 800 comprises a peer-to-peer communication protocol manager 804 for handling a peer-to-peer communication protocol. The peer-to-peer communication protocol manager 804 may be included in an email client 802. The messaging client may also comprise the message interceptor 806 adapted for receiving a message comprising a composite identifier 502 (depicted in FIG. 5). Referring back to FIG. 5, the composite identifier 502 may comprise the thread identifier, the tangent identifier, a sender identifier, a depth-level identifier and the unique message identifier.

Referring back to FIG. 8, messaging client 800 may comprise the message management module 808 adapted for determining whether message-thread content is missing in the received message, and adapted for sending a broadcast message using the peer-to-peer communication protocol requesting the missing message-thread content—e.g., at least one body—and receiving the missing message-thread content via the peer-to-peer communication protocol if the message-thread content is missing in the message.

Embodiments of the invention may be implemented together with any type of computer, known or contemplated, regardless of the platform being suitable for storing and/or executing program code. With reference to FIG. 9, an exemplary computing system 900 suitable for executing the proposed method is shown.

The computing system 900 is only one example of a suitable computer system and is not intended to suggest any limitation as to the scope of use or functionality of embodiments of the invention described herein. Regardless, computer system 900 is capable of being implemented and/or performing any of the functionality set forth hereinabove. In the computer system 900, there are components, which are operational with numerous other general purpose or special purpose computing system environments or configurations. Examples of well-known computing systems, environments, and/or configurations that may be suitable for use with computer system/server 900 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 900 may be described in the general context of computer system-executable instructions, such as program modules, being executed by a computer system 900. Generally, program modules may include routines, programs, objects, components, logic, data structures, and so on that perform particular tasks or implement particular abstract data types. Computer system/server 900 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 900 is shown in the form of a general-purpose computing device. The components of computer system/server 900 may include, but are not limited to, one or more processors or processing units 902, a system memory 904, and a bus 906 that couples various system components including system memory 904 to the processor 902. Bus 906 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 900 typically includes a variety of computer system readable media. Such media may be any available media that is accessible by computer system/server 900, and it includes both, volatile and non-volatile media, removable and non-removable media.

The system memory 904 may include computer system readable media in the form of volatile memory, such as random access memory (RAM) 908 and/or cache memory 910. Computer system/server 900 may further include other removable/non-removable, volatile/non-volatile computer system storage media. By way of example only, storage system 912 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 906 by one or more data media interfaces. As will be further depicted and described below, memory 904 may include at least one program product having a set (e.g., at least one) of program modules that are configured to carry out the functions of embodiments of the invention.

Program/utility 914, having a set (at least one) of program modules 916, may be stored in memory 904 by way of example, and not limitation, as well as an operating system, one or more application programs, other program modules, and program data. Each of the operating system, one or more application programs, other program modules, and program data or some combination thereof, may include an implementation of a networking environment. Program modules 916 generally carry out the functions and/or methodologies of embodiments of the invention as described herein.

The computer system/server 900 may also communicate with one or more external devices 918 such as a keyboard, a pointing device, a display 920, etc.; one or more devices that enable a user to interact with computer system/server 900; and/or any devices (e.g., network card, modem, etc.) that enable computer system/server 900 to communicate with one or more other computing devices. Such communication can occur via Input/Output (I/O) interfaces 914. Still yet, computer system/server 900 may communicate with one or more networks such as a local area network (LAN), a general wide area network (WAN), and/or a public network (e.g., the Internet) via network adapter 922. As depicted, network adapter 922 may communicate with the other components of computer system/server 900 via bus 906. It should be understood that although not shown, other hardware and/or software components could be used in conjunction with computer system/server 900. Examples, include, but are not limited to: microcode, device drivers, redundant processing units, external disk drive arrays, RAID systems, tape drives, and data archival storage systems, etc.

Additionally, messaging client 800 for a message-thread management may be attached to the bus system 906.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for message-thread management with a messaging client, the method comprising:
    receiving a message-thread comprising a signature and a body, wherein the signature comprises a composite identifier comprising a thread identifier, a tangent identifier, a sender identifier, a depth-level identifier, and a unique message identifier;
    determining that message-thread content is missing from the message-thread;
    sending, in response to the determining that message-thread content is missing, a broadcast message using a peer-to-peer protocol requesting the missing message-thread content; and
    receiving, in response to the broadcast message, the missing message-thread content via the peer-to-peer protocol,
    wherein the message client comprises a peer-to-peer communication protocol manager for handling the peer-to-peer protocol,
    wherein the messaging client maintains a directory of peer messaging clients, and
    wherein the directory provides a mapping of an email-address of a received message and the sender identifier associated with the composite identifier.

2. The method according to claim 1, further comprising:
    generating a reconstructed message-thread by integrating the missing message-thread content into the message-thread, wherein the reconstructed message-thread comprises all message bodies associated with the message-thread.

3. The method according to claim 2, further comprising:
    displaying the reconstructed message-thread in a graphical representation allowing navigation to any of the message bodies associated with the message-thread.

4. The method according to claim 1, wherein the peer-to-peer communication protocol manager uses SMTP as a carrier protocol.

5. The method according to claim 1, further comprising:
    comparing a newly received message to an earlier received message associated with the message-thread; and
    determining, based on a criteria catalogue, that the newly received message and belongs to the message-thread.

6. The method according to claim 5, wherein the criteria catalogue comprises a criteria selected from the group consisting of a changed recipient, a changed message subject, a different quoting section, a depth-level in a response, and a low text similarity in quoted text of message bodies with a depth level greater than a predefined threshold.

7. The method according to claim 1, further comprising:
    comparing a newly received message to an earlier received message associated with the message-thread;
    determining, based on a criteria catalogue, that the newly received message does not belong to the message-thread; and
    assigning a new tangent identifier to a response to the newly received message.

8. The method according to claim 7, wherein the criteria catalogue comprises a criteria selected from the group consisting of a changed recipient, a changed message subject, a different quoting section, a depth-level in a response, and a low text similarity in quoted text of message bodies with a depth level greater than a predefined threshold.

9. The method according to claim 1, wherein the messaging client maintains a reputation score value for a received sender identifier, wherein the reputation score value indicates a trustworthiness level of a sender associated with the received sender identifier.

10. A computer system for message-thread management with a messaging client, the computer system comprising:
    at least one processing unit;
    at least one computer readable memory;
    at least one computer readable tangible, non-transitory storage medium; and program instructions stored on the at least one computer readable tangible, non-transitory storage medium for execution by the at least one processing unit via the at least one computer readable memory, wherein the program instructions comprise program instructions for:
    receiving a message-thread comprising a signature and a body, wherein the signature comprises a composite identifier comprising a thread identifier, a tangent identifier, a sender identifier, a depth-level identifier, and a unique message identifier;
    determining that message-thread content is missing from the message-thread;
    sending, in response to the determining that message-thread content is missing, a broadcast message using a peer-to-peer protocol requesting the missing message-thread content; and
    receiving, in response to the broadcast message, the missing message-thread content via the peer-to-peer protocol,
    wherein the message client comprises a peer-to-peer communication protocol manager for handling the peer-to-peer protocol;
    wherein the messaging client maintains a directory of peer messaging clients, and
    wherein the directory provides a mapping of an email-address of a received message and the sender identifier associated with the composite identifier.

11. The computer system according to claim 10, further comprising program instructions for:
    generating a reconstructed message-thread by integrating the missing message-thread content into the message-thread, wherein the reconstructed message-thread comprises all message bodies associated with the message-thread.

12. The computer system according to claim 11, further comprising program instructions for:
    displaying the reconstructed message-thread in a graphical representation allowing navigation to any of the message bodies associated with the message-thread.

13. The computer system according to claim 10, wherein the peer-to-peer communication protocol manager uses SMTP as a carrier protocol.

14. The computer system according to claim 10, further comprising program instructions for:
   comparing a newly received message to an earlier received message associated with the message-thread; and
   determining, based on a criteria catalogue, that the newly received message belongs to the message-thread.

15. The computer system according to claim 14, wherein the criteria catalogue comprises a criteria selected from the group consisting of a changed recipient, a changed message subject, a different quoting section, a depth-level in a response, and a low text similarity in quoted text of message bodies with a depth level greater than a predefined threshold.

16. The computer system according to claim 10, further comprising program instructions for:
   comparing a newly received message to an earlier received message associated with the message-thread;
   determining, based on a criteria catalogue, that the newly received message does not belong to the message-thread; and
   assigning a new tangent identifier to a response to the newly received message.

17. The computer system according to claim 16, wherein the criteria catalogue comprises a criteria selected from the group consisting of a changed recipient, a changed message subject, a different quoting section, a depth-level in a response, and a low text similarity in quoted text of message bodies with a depth level greater than a predefined threshold.

18. A computer program product for message-thread management with a messaging client, the computer program product comprising at least one computer readable non-transitory storage medium having computer readable program instructions thereon for execution by a processor, the computer readable program instructions comprising program instructions for:
   receiving a message-thread comprising a signature and a body, wherein the signature comprises a composite identifier comprising a thread identifier, a tangent identifier, a sender identifier, a depth-level identifier, and a unique message identifier;
   determining that message-thread content is missing from the message-thread;
   sending, in response to the determining that message-thread content is missing, a broadcast message using a peer-to-peer protocol requesting the missing message-thread content; and
   receiving, in response to the broadcast message, the missing message-thread content via the peer-to-peer protocol,
   wherein the message client comprises a peer-to-peer communication protocol manager for handling the peer-to-peer protocol,
   wherein the messaging client maintains a directory of peer messaging clients, and
   wherein the directory provides a mapping of an email-address of a received message and the sender identifier associated with the composite identifier.

\* \* \* \* \*